United States Patent [19]

Millen

[11] Patent Number: 4,518,767
[45] Date of Patent: May 21, 1985

[54] CURING OF POLYSULFIDE LIQUID POLYMERS WITH ZINC OXIDE AND A SOURCE OF COPPER IONS

[75] Inventor: Edward G. Millen, Princeton, N.J.

[73] Assignee: Morton Thiokol, Inc., Chicago, Ill.

[21] Appl. No.: 574,447

[22] Filed: Jan. 27, 1984

[51] Int. Cl.³ .............................................. C08G 75/04
[52] U.S. Cl. ..................................................... 528/374
[58] Field of Search .......................................... 528/374

[56] References Cited

U.S. PATENT DOCUMENTS

| | | | |
|---|---|---|---|
| 3,349,057 | 10/1967 | Giordano | 260/45.75 |
| 3,505,258 | 4/1970 | Panek et al. | 260/24 |
| 3,586,660 | 6/1971 | Sakata et al. | 260/79 |
| 3,637,612 | 1/1972 | Bertozzi | 260/79 |
| 3,714,132 | 1/1973 | Nakanishi et al. | 260/79 |

*Primary Examiner*—Melvyn I. Marquis
*Attorney, Agent, or Firm*—Gerald K. White; George F. Wheele

[57] ABSTRACT

A curable liquid polysulfide polymer composition having improved toughness and tear resistance, comprising a major portion of a liquid organic polysulfide polymer having a molecular weight of about 500 to about 10,000 atomic mass units; zinc oxide; and a source of copper ions, preferably cupric acetate. In the preferred composition the liquid organic polysulfide polymer is a mixture of two polymers having different molecular weights.

4 Claims, No Drawings

CURING OF POLYSULFIDE LIQUID POLYMERS WITH ZINC OXIDE AND A SOURCE OF COPPER IONS

TECHNICAL FIELD

The present application relates generally to liquid polysulfide polymers which are curable to form solid elastomeric materials. More particularly, the invention relates to such materials employing a combination of zinc oxide and a source of copper ions as a novel curing agent.

BACKGROUND ART

Polysulfide rubbers have long been known in the art and are known to have certain outstanding properties such as excellent resistance to a wide range of solvents, good resistance to atmospheric oxidation and weathering, adherence to metals, and retention of their elastic properties over a relatively wide temperature range. They were initially produced as solid polymers. At a later date methods were developed (as disclosed, for example, in U.S. Pat. No. 2,466,963) for splitting the solid polymers to form liquid polythiopolymercaptan polymers that are curable to form rubber-like materials having the desirable properties described above. The liquid polymers are particularly useful in a wide variety of applications because of the ease of handling a liquid material and of forming it to a desired configuration in which it can be cured to become a shaped elastomeric product.

As disclosed in U.S. Pat. No. 2,466,963, the polysulfide polymer molecules are characterized by the recurring unit (RSS), in which R represents the same or different divalent organic radicals that can vary widely in their specific structure, but are typically alkylene or oxyhydrocarbon radicals interconnected by disulfide groups. While a wide variety of such polymers can be prepared, the polymers that are presently of commercial importance fall within a somewhat more limited group. Several of the commercially important liquid polymers are particularly described in articles by Fettes and Jorczak, published in *Industrial and Engineering Chemistry*, vol. 42, page 2217 (1950) and vol. 43, page 324 (1951). As pointed out in these articles, the commercially available liquid polysulfide polymers, e.g., the LP-2, LP-3, LP-12, LP-31, LP-32, and LP-33 polymers, available from Thiokol Corporation, Chicago, Ill. ("LP" is a registered trademark of Thiokol Corporation) are generally prepared from bis-beta-chloroethylformal and have essentially the following structure:

$$HS(C_2H_4OCH_2OC_2H_4SS)_xC_2H_4OCH_2OC_2H_4SH$$

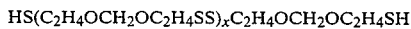

wherein x has an average value of from about 2 to about 59, preferably from about 5 to about 20. These liquid polysulfides can be cured to form solid elastomers by oxidizing the thiol terminal groups of two polysulfide molecules to form a disulfide linkage and water as a by-product, according to the following reaction:

$$2R-SH+(O)\rightarrow R-S-S-R+H_2O$$

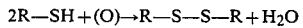

In the manufacture of these commercial liquid polysulfide polymers a small percentage of trichloropropane is commonly mixed with the formal to provide from 0.1 to 4% cross-linking. The molecular weights of these liquid polymers may vary from 500 to 10,000 and their viscosities from 300 to 100,000 centipoise at 25° C.

While a large number of curing agents and procedures previously have been proposed for curing liquid polysulfide polymers, there are still certain applications for which the known cures are not completely satisfactory. In particular, materials having improved tensile strength, elongation, and tear resistance would be desirable. It is the object of this invention to provide materials having these improved qualities.

U.S. Pat. No. 3,586,660, issued to Sakata, et al. on June 22, 1971, teaches a one-package, curable composition comprising a liquid polysulfide polymer, a peroxide curing agent, and a suitable accelerating agent. Example 4 of that patent discloses the combination of 10 parts per hundred parts by weight resin (pphr) of cupric acetate and 10 pphr of zinc peroxide with LP-2 liquid polysulfide polymer, mixed in a two roll mill.

U.S. Pat. No. 3,637,612, issued to Bertozzi on Jan. 25, 1972, teaches liquid polysulfide rubbers cured quickly, to form a hard final product, with a weak acid such as acetic acid and a zinc compound such as zinc oxide or peroxide. Example 1 of that patent is believed representative of the disclosure.

Two other patents which may be pertinent are U.S. Pat. No. 3,714,132, issued to Nakanishi, et al. on Jan. 30, 1973 and U.S. Pat. No. 3,349,057, issued to Giordano on Oct. 24, 1967. The former patent teaches a one-package, storage, stable curable liquid polysulfide polymer including as curing agents an acid activatable curing agent and an organosilicon carboxylic acid. Nakanishi also teaches that zinc peroxide, manganese dioxide, and other curing agents are activated by a lower organic fatty acid such as acetic acid or propionic acid. Nakanishi teaches that the organic silicon compound releases a lower fatty acid when the polysulfide composition contacts water. The Giordano patent teaches that polysulfide polymers can be cured with metal oxide curing agents, orthonitroanisole, copper salts, and polar liquids. Giordano specifically includes cupric acetate as a copper salt within the scope of the invention, but zinc oxides are not disclosed therein.

Finally, a reference of marginal pertinence is U.S. Pat. No. 3,505,258, issued to Panek, et al. on Apr. 7, 1970. Panek teaches the combination of cumene hydroperoxide and cupric abietate as a curing agent for polysulfide rubbers.

SUMMARY OF THE INVENTION

The invention is a curable liquid polysulfide polymer composition having improved toughness and tear resistance, comprising a liquid organic polysulfide polymer having a molecular weight of from about 500 to about 10,000, to which is added a curing agent comprising about 2 to 20 pphr of zinc oxide and about 2 to 20 pphr of a source of copper ions.

In the preferred composition the liquid polysulfide polymer is a mixture of two species, each having the following general formula:

$$HS(C_2H_4OCH_2OC_2H_4SS)_xC_2H_4OCH_2OC_2H_4SH$$

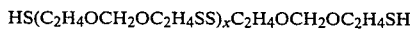

For one of the species x has an average value of about 5 and for the other species x has an average value of about 23. The preferred species of a source of copper ions is cupric acetate.

EXAMPLE

Formulations were passed through a three roll mill. Portions were permitted to stand at room temperature while the remainder were exposed to 70° C. temperatures for up to 24 hours. The cured systems were shredded on a rubber mill and then pressed into ASTM sheets. Stress-strain properties were then obtained.

|  | 1 | 2 | 3 | 4 |
| --- | --- | --- | --- | --- |
| Formulations | | | | |
| LP2 | 100 | 100 | — | 50 |
| LP3 | — | — | 100 | 50 |
| Mn—O$_2$ (Shepherd's activated grade) | 5 | — | — | — |
| Zinc oxide | — | 5 | 5 | 5 |
| Cupric acetate | — | 5 | 5 | 5 |
| Cure Characteristics | | | | |
| at Room Temperature | 1 hr | 1 hr | no cure 2 + days | 2 + days |
| at 70° C. | 1 hr | 1 hr | no cure 2 + days | 16 hrs. |
| Stress-Strain Properties | | | | |
| Tensile, psi | 150 | 180 | — | 200 |
| Elongation, % | 120 | 440 | — | 860 |
| Shore "A" hardness | 35 | 30 | — | 35 |
| Tear, pli | 22 | 45 | — | 54 |
| Aged 1 week at 70° C. | | | | |
| Tensile, psi | 200 | 185 | — | 280 |
| Elongation, % | 110 | 560 | — | 550 |
| Shore "A" hardness | 42 | 37 | — | 38 |
| Tear, | 22 | 49 | — | 55 |

The data above show that the zinc oxide plus cupric acetate cure system (formulations 2 and 4) imparted significant improvement in tear resistance over the manganese dioxide cure system control (formulation 1). Elongation is also much higher without substantially decreased hardness.

What is claimed is:

1. A curable liquid polysulfide polymer composition having improved toughness and tear resistance, comprising:
   A. 100 parts by weight of a liquid organic polysulfide polymer having a molecular weight of from about 500 to about 10,000;
   B. about 2–20 parts by weight of zinc oxide; and
   C. about 2–20 parts by weight of a copper salt.

2. The composition of claim 1, comprising about 5 parts by weight of zinc oxide and about 5 parts by weight of cupric acetate.

3. The composition of claim 1, wherein said liquid organic polysulfide polymer comprises a mixture of two species, each having the formula:

$$HS(C_2H_4OCH_2OC_2H_4SS)_xC_2H_4OCH_2OC_2H_4SH$$

wherein for one said species the average value of $x$ is 5 and for the other said species the average value of $x$ is 23.

4. The composition of claim 3, comprising about equal parts by weight of said first and second species.